United States Patent
Sodani et al.

(10) Patent No.: US 11,551,148 B2
(45) Date of Patent: Jan. 10, 2023

(54) SYSTEM AND METHOD FOR INT9 QUANTIZATION

(71) Applicant: Marvell Asia Pte, Ltd., Singapore (SG)

(72) Inventors: Avinash Sodani, San Jose, CA (US); Ulf Hanebutte, Gig Harbor, WA (US); Chia-Hsin Chen, Santa Clara, CA (US)

(73) Assignee: Marvell Asia Pte Ltd, Singapore (SG)

( * ) Notice: Subject to any disclaimer, the term of this patent is extended or adjusted under 35 U.S.C. 154(b) by 464 days.

(21) Appl. No.: 16/862,549

(22) Filed: Apr. 29, 2020

(65) Prior Publication Data
US 2021/0342734 A1    Nov. 4, 2021

(51) Int. Cl.
*G06N 20/00*    (2019.01)
(52) U.S. Cl.
CPC ................... *G06N 20/00* (2019.01)
(58) Field of Classification Search
None
See application file for complete search history.

(56) References Cited

U.S. PATENT DOCUMENTS

| | | | | |
|---|---|---|---|---|
| 5,838,984 | A * | 11/1998 | Nguyen | G06F 9/30145 712/E9.035 |
| 2006/0253521 | A1* | 11/2006 | Sadafale | G06F 7/523 708/620 |
| 2019/0042244 | A1* | 2/2019 | Henry | G06F 7/5324 |
| 2019/0294413 | A1* | 9/2019 | Vantrease | G06N 3/063 |
| 2019/0369960 | A1* | 12/2019 | Mueller | G06F 7/49968 |
| 2020/0387472 | A1* | 12/2020 | Ramesh | G06F 9/30014 |
| 2021/0019115 | A1* | 1/2021 | Venkatesh | G06F 7/5334 |
| 2021/0326111 | A1* | 10/2021 | Langhammer | G06F 7/523 |

OTHER PUBLICATIONS

Scalar Arithmetic Multiple Data: Customizable Precision for Deep Neural Networks, Anderson et al., arXiv:1809.10572v2 [cs.PF] Dec. 12, 2019.*
A 28-nm Compute SRAM With Bit-Serial Logic/Arithmetic Operations for Programmable In-Memory Vector Computing; Wang et al., IEEE Journal of Solid-State Circuits, vol. 55, No. 1, Jan. 2020.*

* cited by examiner

*Primary Examiner* — David J Stoltenberg (57) ABSTRACT

A method of converting a data stored in a memory from a first format to a second format is disclosed. The method includes extending a number of bits in the data stored in a double data rate (DDR) memory by one bit to form an extended data. The method further includes determining whether the data stored in the DDR is signed or unsigned data. Moreover, responsive to determining that the data is signed, a sign value is added to the most significant bit of the extended data and the data is copied to lower order bits of the extended data. Responsive to determining that the data is unsigned, the data is copied to lower order bits of the extended data and the most significant bit is set to an unsigned value, e.g., zero. The extended data is stored in an on-chip memory (OCM) of a processing tile of a machine learning computer array.

25 Claims, 6 Drawing Sheets

SYSTEM AND METHOD FOR INT9 QUANTIZATION

BACKGROUND

A hardware-based machine learning (ML) system typically includes multiple cores/subsystems (blocks and tiles), each having its own processing units and on-chip memory (OCM). The ML system may process quantized numbers for various calculations. For example, quantized data stored in a memory unit, e.g., a double data rate (DDR) memory, may be transmitted to the processing tiles such that the data can be processed by the processing units for various ML operations.

In general, floating point numbers (data) are converted into quantized data format for storage, e.g., in a DDR, and subsequent processing, e.g., by an ML system. The quantized formats may include but are not limited to signed integer, unsigned integer, etc., which are used in arithmetic logic unit (ALU) calculations. Often, a mix of quantized format types is used, e.g., by ML system, for various calculations.

Unfortunately, there is currently no mechanism to perform ALU calculation on a mixture of quantized format types without introducing an offset. As such, the format type for each operand is tracked when a mixture of quantized format types is used in an ALU calculation, which increases the complexity and latency for the ALU calculation. Furthermore, in the ML system, an integer value may need to be rescaled before it is input into a processing unit. A mathematical division in a processor, however, is often time consuming and inefficient.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

A new programmable hardware architecture for machine learning (ML) is proposed, which includes at least a host, a memory, a core, a data streaming engine, an instruction-streaming engine, and an interference engine. The memory is configured to store floating point numbers in quantized format, including but not limited to int8, uint8, etc. According to some embodiments, the quantized data stored in the memory is converted into an int9 format, thereby representing different quantized data format types, e.g., int8, uint8, etc., uniformly as well as providing symmetric quantization (i.e. quantization is symmetric with respect to zero) of the data while eliminating a need to perform an offset calculation. It is appreciated that converting the data into int9 format type enables the inference engine to perform ALU calculations on a homogeneous int9 format type operands without a need to keep track of the format type for quantized operand, thereby simplifying the complexity as well as resulting in a faster processing time.

In some embodiments, when data is being read from a memory unit, e.g., a DDR, the 8-bit number is converted into an int9 format type based on whether the number stored in the memory unit is int8 or uint8, as a non-limiting example. In some embodiments, 9 bits are used and int8 format type is sign-extended to an int9 format type, whereas uint8 format type is copied to the least significant bits of the 9-bit data and its most significant bit (i.e. bit order 9) is unsigned, e.g., set to zero. It is appreciated that a software component may ensure that the value of int9 being written to a memory unit, e.g., 8-bit DDR, is within the appropriate range of int8, uint8, etc., since eight bits are not enough to store the full int9 range.

In some embodiments, the software component is configured to perform operations to restrict the range of an int9 number to be within a range for int8, uint8, etc., or alternatively perform an operation on an int9 number to represent it as two int9 numbers, one within the int8 range and another within the uint8 range. Representing int9 number as two int9 numbers, one within the int8 range and another within the uint8 enables the least significant bits of the int9 number to be copied into an 8-bit DDR while preserving the information.

In some embodiments, the core of the programmable hardware architecture is configured to interpret a plurality of ML commands/instructions for an ML operation and/or data received from the host and coordinate activities of the streaming and the inference engines based on the data in the received ML commands. The inference engine may include a dense operation engine and an irregular operation engine. The dense operation engine is an engine that is optimized to efficiently process dense data with regular operations, e.g., matrix operations such as multiplication, matrix manipulation, tan h, sigmoid, etc. On the other hand the irregular operation engine is an engine that is optimized to efficiently process sporadic data with irregular operations, e.g., memory transpose, operations on irregular data structures (such as trees, graphs, and priority queues). According to some embodiments, the core may coordinate some of the instructions received from the host to be processed. In some embodiments, the core may be a general processor, e.g., a CPU.

In some embodiments, the core is specifically configured to divide the plurality of ML commands between the core and the inference engine for efficient execution. The ML commands and relevant data to be executed by the inference engine are transmitted from the core and the memory to the instruction-streaming engine and the data streaming engine for efficient streaming to the inference engine. As presented above, the data being read from the memory unit is converted into int9 format. The data and instruction streaming engines are configured to send one or more data streams and ML commands to the inference engine in response to the received programming instructions from the core. The inference engine is configured to process the instruction/data streams received from the data/instruction stream engines for the ML operation according to the programming instructions received from the instruction/data streaming engines.

It is appreciated that the data input of a dense operation engine of the inference engine may need to be rescaled before certain operations, e.g., tan h, sigmoid, etc. In order to rescale in an efficient manner, the data input into int32 format is multiplied by an integer scale value and subsequently shifted. In order to achieve the highest possible precision and lowest error in calculation, a relationship between the integer scale value and the shift value is obtained based on a register size storing the integer data, e.g., int32.

Figure 1:
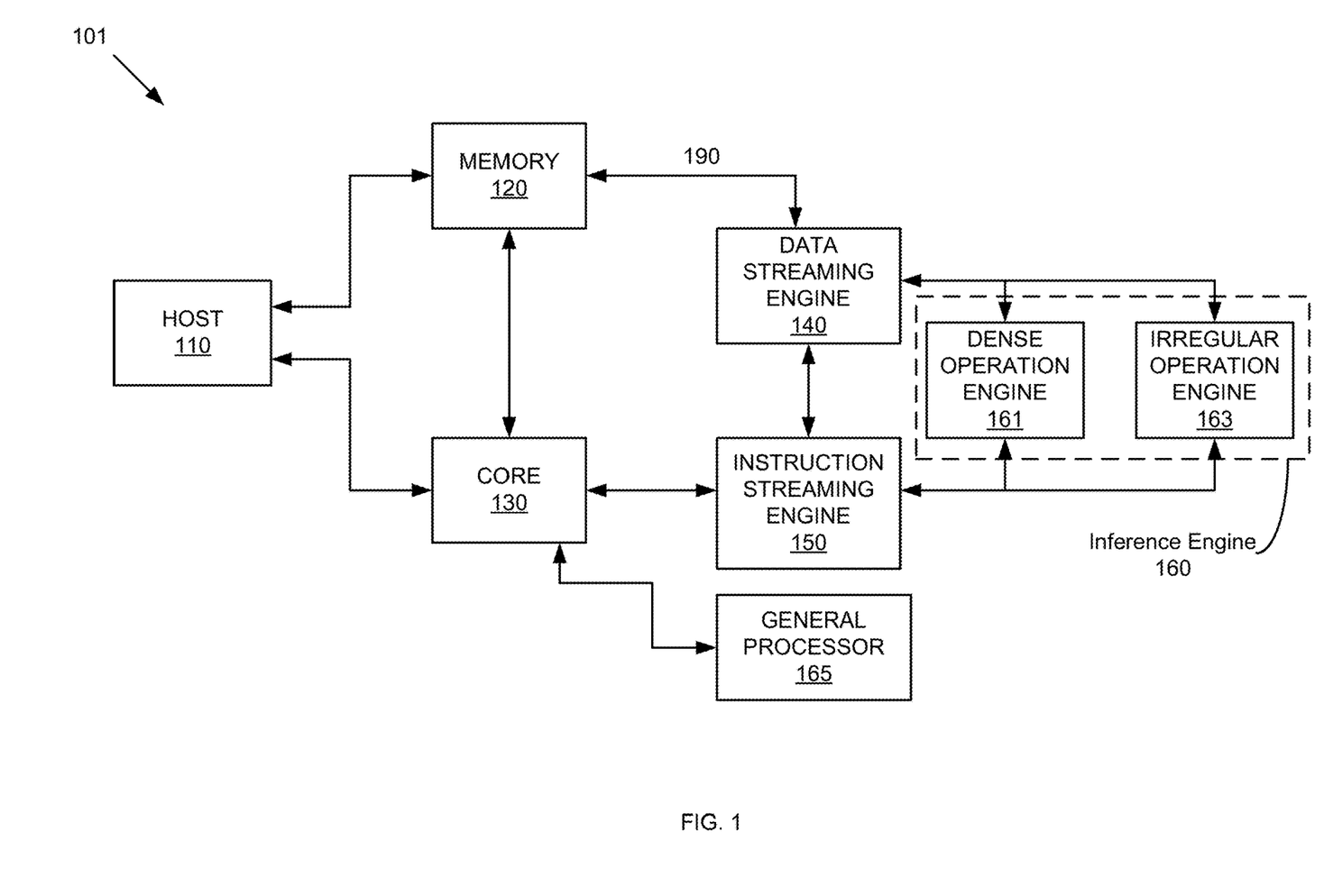
FIG. 1 depicts an illustrative example of a hardware-based programmable architecture configured to support machine learning according to one aspect of the present embodiments.

Referring now to FIG. 1, an example of a diagram of a hardware-based programmable system/architecture 101 configured to support machine learning is depicted. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks. Each of the engines in the architecture 101 is a dedicated hardware block/component including one or more microprocessors and on-chip memory units storing data and software instructions programmed by a user for various machine learning operations. When the software instructions are executed by the microprocessors, each of the hardware components becomes a special purposed hardware component for practicing certain machine learning functions as discussed in detail below. In some embodiments, the architecture 101 is on a single chip, e.g., a system-on-chip (SOC).

In the example of FIG. 1, the architecture 101 may include a host 110 coupled to a memory (e.g., DDR) 120 and a core engine 130. The memory 120 may be coupled to a direct memory access (DMA) engine (not shown) and network interface controller (NIC) (not shown) in order to receive external data. The memory 120 may internally be connected to a data streaming engine 140. The core 130 is coupled to an instruction-streaming engine 150, which is coupled to the data streaming engine 140. The core 130 is also coupled to a general processor 165. In some embodiments, the general processor 165 can be part of the core 130. The instruction-streaming engine 150 and the data streaming engine 140 are coupled to an inference engine 160 that includes the dense operation engine 161 and irregular operation engine 163. It is appreciated that the inference engine 160 may include an array for performing various computations. It is appreciated that any discussion of the array for performing various computations in the inference engine 160 is for illustrative purposes and should not be construed as limiting the scope of embodiments. For example, in some embodiments, an array for performing various computations may reside outside of the inference engine 160.

It is appreciated that the external data may be in floating point format, e.g., 32-bit floating point. As such, when the data is being stored in the memory 120, e.g., an 8-bit DDR, it may be converted into an integer format type, e.g., int8, uint8, etc. It is appreciated that uint8 ranges from 0 to 255 while int8 ranges from −128 to 127. In contrast, int9 ranges from −256 to 255 and as such can represent both int8 and uint8 without any offset calculations. Using int9 as uint8 range and int8 range enables the data to be copied to a standard 8-bit DDR. It is appreciated that the description with respect to a 32-bit floating point and use of an 8-bit DDR is for illustrative purposes and should not be construed as limiting the scope of the embodiments. The floating point data is ultimately quantized into int9 instead of int8 or uint8. Furthermore, since int9 range covers both positive and negative values, it results in zero offset and it further simplifies rescaling of the int9 number in the ML system. Accordingly, when data is being read from the memory 120, e.g., an 8-bit DDR, it is converted into an int9 format. It is appreciated that once the data is converted into int9 format there would be no need to track the type of operand when a mix of different format types is being used in a calculation. For example, using int9 would eliminate the need to track whether the operand in a calculation being performed is int8, uint8, etc.

It is further appreciated that in some embodiments the memory 120, e.g., a DDR, may store a floating-point number, e.g., 32-bit floating point as four 8-bit values. As such, when the data is being read from the memory 120, e.g., an 8-bit DDR, into an on-chip-memory, the quantization is performed from a 32-bit floating point to int9 in either the general processor 165 or the irregular operation engine 163. In some embodiments, the registers within the general processor 165 and/or the irregular operation engine 163 stores the 32-bit wide that holds the 32-bit floating point value. As such, the floating point number may be converted into an int9 number for use in the ML system. However, a 32-bit floating point number is scaled first in order be converted to an int9 format. For example, the appropriate scale may be:

Scale=(upper range of floating point−lower range of floating point)/(upper range of int9−lower range of int9)=(End−(−End))/(255−(−255))=2End/(2(255))=End/255.

Figure 2A:
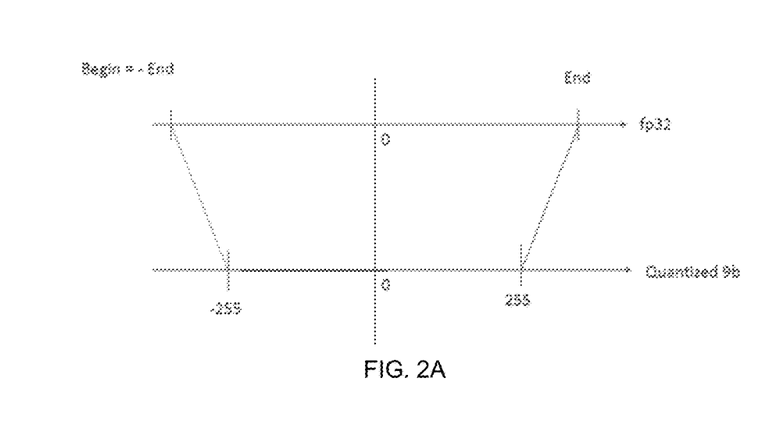
FIGS. 2A-2D show quantization from one number format type to another that is implemented by the hardware-based programmable architecture in FIG. 1.
Figure 2B:
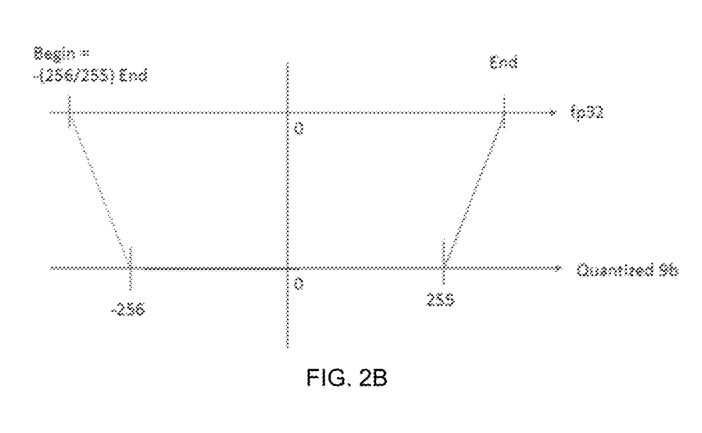
Figure 2C:
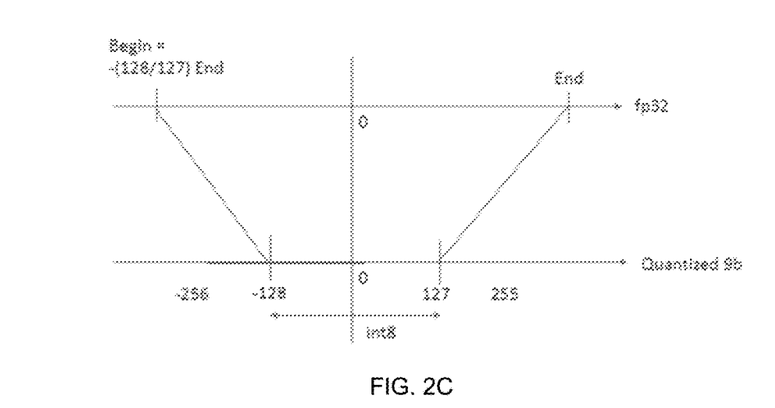

It is appreciated that the same scale may be used when extended to include −256 for int9 lower range. It is appreciated that FIG. 2A illustrates symmetric quantization and mapping of a 32-bit floating point to int9 full range, while FIG. 2B illustrates the mapping of FIG. 2A to include −256 for int9. As illustrated the same scale may be used for both FIGS. 2A and 2B. FIG. 2C illustrates the mapping of a 32-bit floating point to an int9 and representation of int8 within int9 range. It is appreciated that the scale for int8 representation within an int9 range is different from the scale determined above. In some embodiments, the scale for representing int8 with 9 bits may be:

Scale=(upper range of floating point−lower range of floating point)/(upper range of int8−lower range of int8)=(End−(−End))/(127−(−127))=End/127.

Figure 2D:
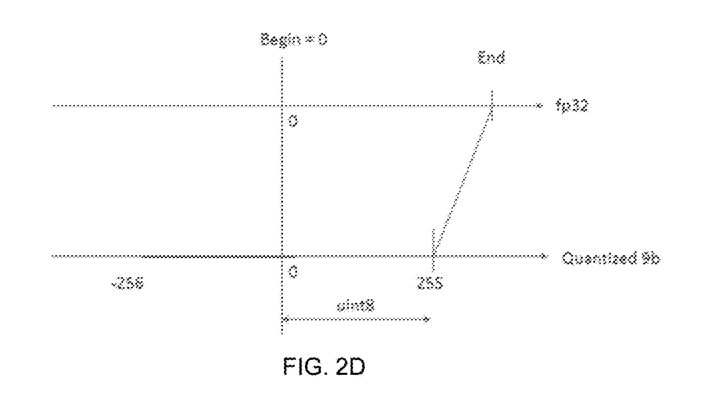

FIG. 2D illustrates the mapping of a 32-bit floating point to an int9 and representation of uint8 within int9 range. It is appreciated that representation of uint8 within int9 range has the same scale as that of FIGS. 2A and 2B.

In some embodiments, when transferring data from the memory 120 into the array, e.g., inference engine 160, etc., the data being transferred is sign extended or zero extended depending on whether the data being transferred is int8 or uint8. In other words, the data is converted from one format type, e.g., int8, uint8, etc., into another format type, e.g., int9. For a non-limiting example, when converting the data from int8 or uint8 to int9 format, an 8-bit data is converted into a 9-bit data by extending the number of bits by one bit. It is determined whether the data being converted is signed, e.g., int8, or unsigned, e.g., uint8. If the data being converted is signed, then the most significant bit of the 9-bit data for int9 is sign extended and if the data being converted is unsigned, then the most significant bit of the 9-bit data for int9 is set to zero. It is appreciated that int8 or uint8 is copied directly into lower order bits (i.e. lower 8 bit order) of the int9 data. It is appreciated that int9 data may be referred to as extended data in comparison to int8 or uint8 format type. The extended data that in this example is in int9 format type is stored in the inference engine 160 to be operated on. In some embodiments, the extended data may be stored in an on-chip memory (OCM) of the inference engine 160 to be processed by a processing tile of the ML computer array. It is appreciated that in some embodiments, a floating-point number, e.g., 32-bit floating point, may be converted into an integer representation, e.g., int9. In one illustrative embodiment, floating point number is quantized and scale appropriately, as illustrated in FIGS. 2A-2D, to be converted into an int9 format type. As illustrated, one scaling value may be used to represent a floating-point number for an int8 in int9 format type while a different scaling value may be used to represent a floating number for an uint8 in int9 format type. It is appreciated that a 16-bit floating-point number stored in the memory unit 120, e.g., a DDR, remains the same when it is being stored from the memory unit 120 into the OCM of the inference engine 160. For a non-limiting example, the lower 7 bits of a 16-bit floating point is the same as the lower 7 bits of its mantissa, the 8th order bit is extended but not used in operation, the remaining mantissa bits are in $9^{th}$ and $10^{th}$ order bits followed by the exponent and the signed bit followed by an additional extended bit that is not used in any operation.

It is appreciated the inference engine 160 may include a plurality of processing tiles arranged in a two-dimensional array of a plurality of rows and columns, e.g., 8 row by 8 columns. Each processing tile may include at least one OCM, one POD unit and one processing engine/element (PE). Here, the OCMs in the processing tiles are configured to receive data from the data streaming engine 140 in a streaming fashion. It is appreciated that the received data may be in int9 format, as described above. The OCMs enable efficient local access to data per processing tile. The processing units, e.g., the PODs and the PEs are configured to perform highly specialized tasks, e.g., dense and sparse computations of a ML operation on the received data in the OCMs, respectively.

It is appreciated that the OCM of a respective processing tile may receive the data in int9 format type for various ALU operation associated with ML operation. It is appreciated that in some embodiments, the format type of data, e.g., whether signed or unsigned, stored in the memory 120 is tracked such that appropriate instruction can be scheduled to be streamed for execution by the appropriate processing unit, e.g., respective POD/PE of the processing tile. In other words, various ALU operations are performed on the data received in int9 format, by the processing tile. The data received in int9 format may be operands of various ALU operations. The result of various ALU operations in int9 format type may be stored in its respective OCM.

In some embodiments, the inference engine 160 includes the dense operation engine 161 that is optimized to efficiently process dense data, e.g., data received from the memory 120 in int9 format, with regular operations, e.g., matrix operations such as multiplication, matrix manipulation, tan h, sigmoid, etc. On the other hand, the inference engine 160 may also include the irregular operation engine 163 that is optimized to efficiently process sporadic data, e.g., in int9 format type, with irregular operations, e.g., memory transpose, addition operation, operations on irregular data structures (such as trees, graphs, and priority queues). According to some embodiments, the core 130 may coordinate some of the instructions received from the host 110 to be processed by the general processor 165, e.g., a CPU, etc.

In some embodiments, the core 130 is configured to execute any software code written through a common high-level language. The core 130 is configured to process a plurality of performance non-critical operations, e.g., data/instruction preparatory work, data collection, data mapping, etc. In some embodiments, the core 130 may also be configured to breakdown the received ML commands into performance critical and noncritical operations/tasks such that the performance noncritical operations can be processed by the core 130 and the performance critical operations (e.g., matrix multiplication) can be processed by the inference engine 160. In other words, the core 130 is configured to divide the plurality of ML commands between the core 130 and the inference engine 160 for efficient execution thereof. In some embodiments, the core 130 may also be configured to assign/divide the plurality of ML commands (also referred to as tasks or sub-tasks) to various components, e.g., the inference engine 160, for processing. In some embodiments, the core 130 is configured to allocate one or more locations in the memory 120 for storing of tasks/commands, the data, result after the data is processed, etc. to be accessed and used by the core 130 or other components, e.g., inference engine 160, in the architecture 101. As such, the core 130 and the inference engine 160 are configured to execute the entire ML algorithms and the operation by themselves instead of having to rely on or require the host 110 to execute certain ML commands or operations. By supporting and executing the entire ML operation on the programmable hardware architecture 101, the core 130 eliminates performance overhead of transferring data to the host 110 and back to execute any non-supported ML operations and reduces burden on the host 110 to achieve a higher performance.

In some embodiments, the ML commands and relevant data, e.g., in int8 format, thereof to be executed by the inference engine 160 are transmitted from the core 130 and the memory 120 to the instruction-streaming engine 150 and the data streaming engine 140 for efficient streaming to the inference engine 160. In some embodiments, the data/instruction steaming engines 140-150 are configured to send one or more data streams and programming instructions to the inference engine 160 in response to the received ML commands from the core 130. It is appreciated that in some embodiments, the format type of data, e.g., whether signed or unsigned, stored in the memory 120 is tracked such that appropriate instruction can be scheduled to be streamed to the dense operation engine 161 and/or irregular operation engine 163 of the inference engine 160. In other words, various ALU operations are performed on the data received in int9 format, by the engines within the inference engine 160. The data received in int9 format may be operands of various ALU operations. The result of various ALU operations in int9 format type may be stored within the dense operation engine 161 and/or irregular operation engine 163 of the inference engine 160. In some embodiments, the result may be stored in appropriate OCM of a processing tile of the ML computer array.

It is appreciated that in some embodiments, the result of the ALU operation within the inference engine 160 is stored within a memory component, e.g., OCM, of the respective processing tile within the inference engine 160. The result stored in the inference engine 160 may be transmitted for storage to the memory unit 120, e.g., DDR. However, prior to storing the result the value of the result may be adjusted to the upper bound range for the data if the value exceeds the upper bound, e.g., maximum value, of the format type of the data in memory unit 120 and it may be adjusted to the lower bound range, e.g., minimum, for the data if the value is less than the lower bound range of the memory unit 120. It is appreciated that the most significant bit of the int9 result is dropped when storing the result from the OCM of the respective processing tile into the memory unit 120.

It is appreciated that in some embodiments, the result of the processing stored in the respective OCM may be transmitted for storage back to the memory unit 120, e.g., DDR. However, prior to storing the result the value of the result may be adjusted to the upper bound range for the data if the value exceeds the upper bound, e.g., maximum value, of the format type of the data in memory unit 120 and it may be adjusted to the lower bound range, e.g., minimum, for the data if the value is less than the lower bound range of the memory unit 120. In other words, the data may be clamped to be within the appropriate range, e.g., int8 range, uint8 range, etc. It is appreciated that the most significant bit of the int9 result is dropped when storing the result from the OCM of the respective processing tile into the memory unit 120. Moreover, it is appreciated that a software module may track whether the data stored in the memory unit 120 was signed or unsigned such that when transferring data from the inference engine, e.g., respective OCM of the inference engine 160, to the memory unit 120, e.g., DDR, the int9 data format type can be interpreted correctly to the appropriate format type, e.g., int8 for data that was of int8 format in the memory unit 120, uint8 for data that was of uint8 format in the memory unit 120, etc.

Figure 3A:
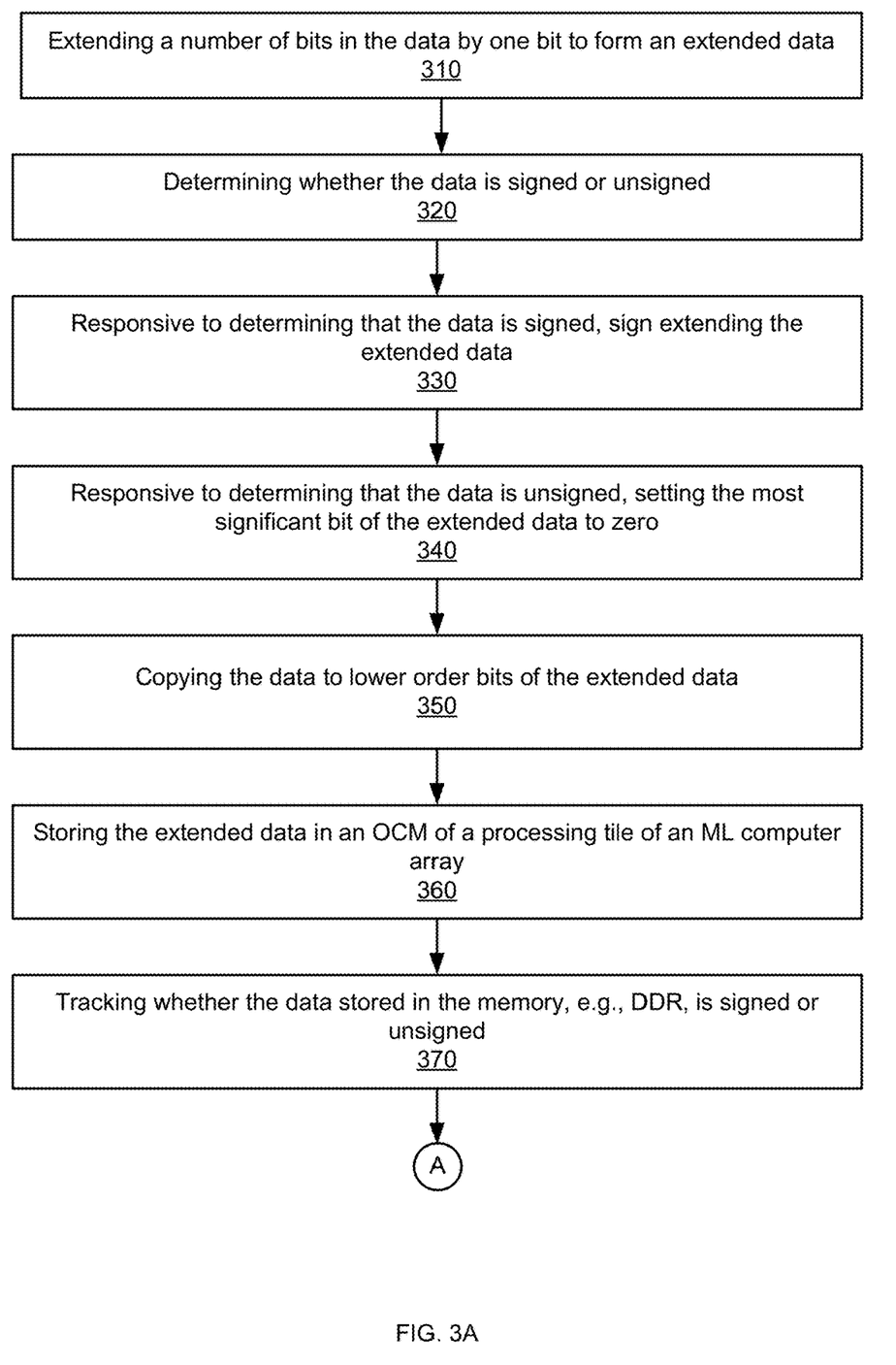
FIGS. 3A-3B show a flow diagram for converting data stored from a first format to a second format according to one aspect of the present embodiments.
Figure 3B:
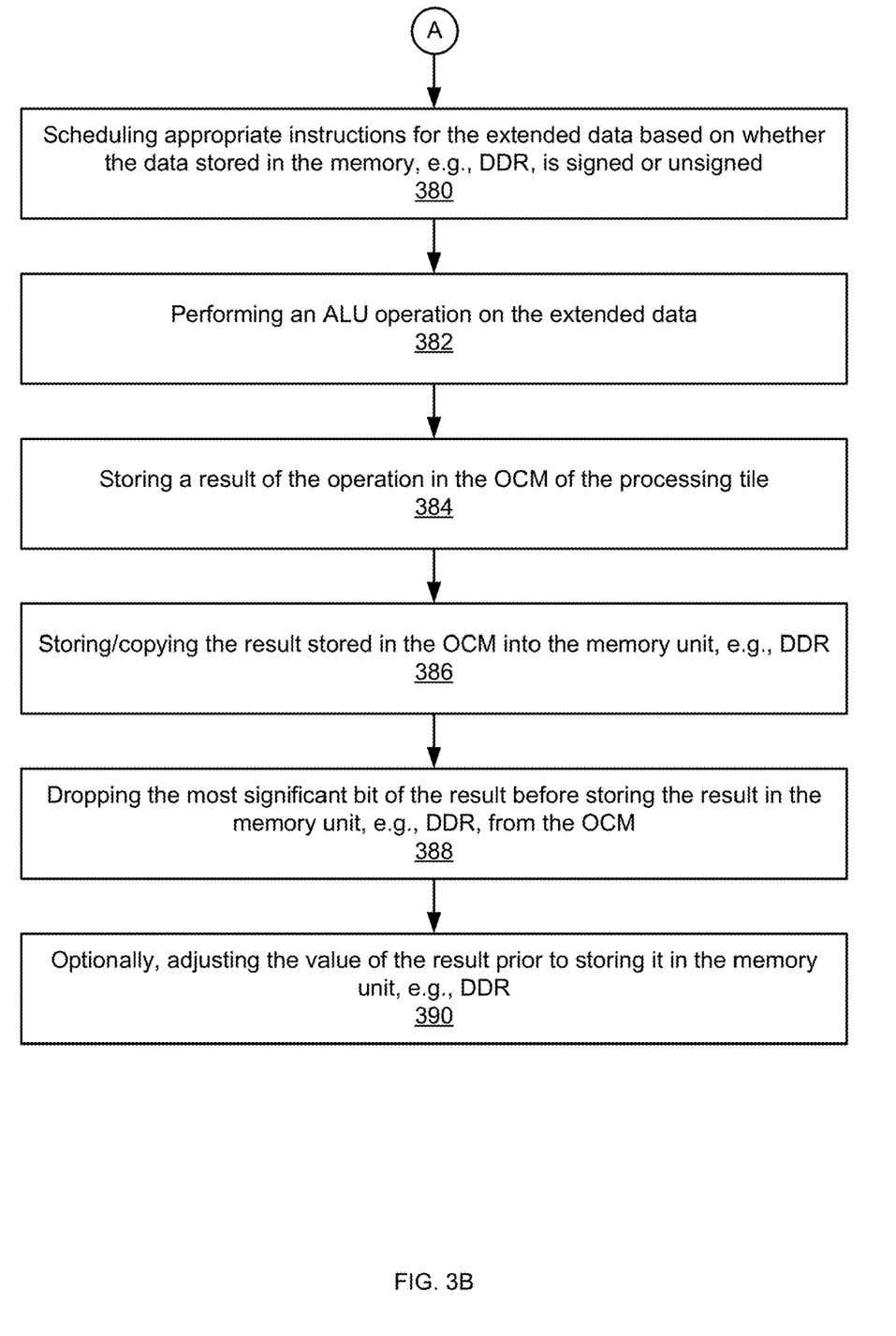

Referring now to FIGS. 3A and 3B, an example of a process to support converting a data stored in a memory, e.g., DDR, from a first format, e.g., int8, uint8, floating point, etc., into a second format type, e.g., int9 as described in FIGS. 1-2D is shown. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

As shown in FIGS. 3A and 3B, at step 310, a number of bits stored in the memory unit 120, e.g., DDR, is extended by one bit to form an extended data, e.g., int9. As such, int8 or uint8 that includes 8 bits is extended to 9 bits. It is appreciated that in some embodiments, the data stored in the memory unit 120 is a floating point number. At step 320, it is determined whether the data stored in the memory 120 is signed, e.g., int8, or unsigned, e.g., uint8. At step 330, responsive to determining that the data is signed, the extended data is sign extended. In contrast, at step 340, responsive to determining that the data is unsigned, the most significant bit of the extended data is set to zero. The data is copied to the lower order bits, at step 350, hence all order bits except for the most significant bit. At step 360, the extended data is copied to the inference engine 160, e.g., OCM of the inference engine 160. It is appreciated that at step 370, whether the data stored in the memory unit 120, e.g., DDR, is signed or unsigned is tracked, and as such appropriate instructions for the extended data are scheduled, at step 380. At step 382, various ALU operations may be performed on the extended data. At step 384, the result of the ALU operation is stored in the OCM. At step 386, the result of the ALU operation that is stored in the OCM is also stored/copied to the memory unit 120, e.g., DDR. At step 388, the most significant bit of the result is dropped before storing the result in the DDR from the OCM. It is appreciated that optionally, at step 390, the value of the result of the ALU may be adjusted prior to storing it from the OCM to the memory unit 120, e.g., DDR, based on the range of the number format type stored in the memory unit 120. For example, if the value of the result stored in the OCM exceed the upper bound range of the number type, e.g., int8 or uint8, etc. stored in the memory unit 120, then the result is adjusted and changed to the maximum or the upper bound range of the number, hence int8, uint8, etc.

Figure 4:
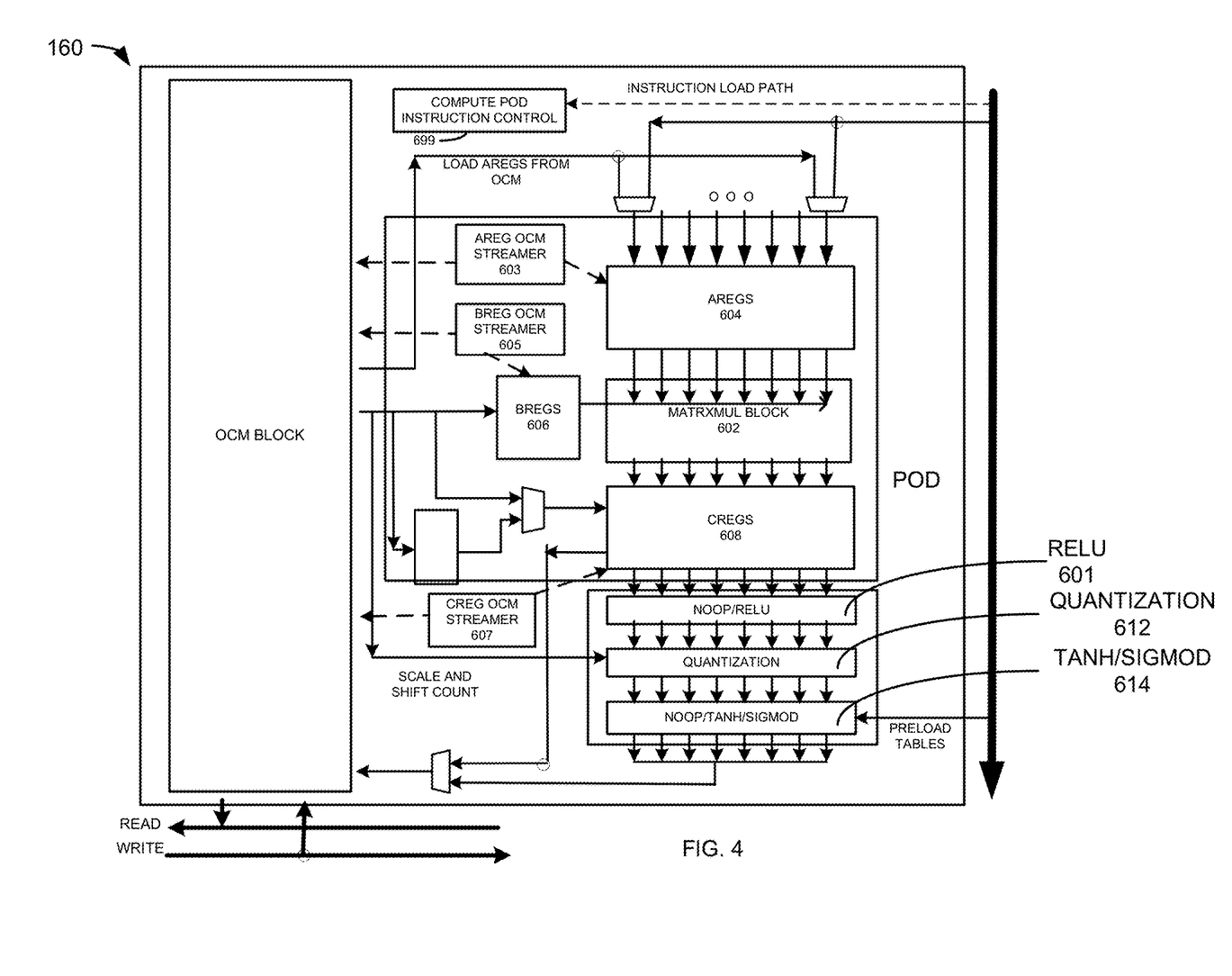
FIG. 4 depicts a diagram of an example of the architecture of a POD unit according to one aspect of the present embodiments.

FIG. 4 depicts a diagram of an example of the architecture of the POD. It is appreciated that the number of components, the size of the components, and the number of bits, matrix sizes, etc. shown in FIG. 4 are for illustrative purposes and not intended to limit the scope of the embodiments. Although matrix multiplication is used as a non-limiting example in the following discussions, it is appreciated that the POD is also configured to perform other types of dense computation tasks of the ML operation. In the example of FIG. 4, a POD includes a compute POD instruction control 699 configured to control loading of data/instructions into various components, e.g., registers, tan h/sigmoid unit 614, etc. It is appreciated that the POD includes a matrix multiplication block 602, which is a two-dimensional array having X number of rows and Y number of columns, wherein each element/cell in the array has a certain number of registers (e.g., MIPS or Microprocessor without Interlocked Pipeline Stages). The matrix multiplication block 602 is configured to multiply two matrices, matrix A of X number of rows and Z number of columns and matrix B of Z number of rows and Y number of columns to generate a matrix C of X number of rows and Y number of columns. It is appreciated that the data being multiplied may be in int9 format type that is stored in their respective OCM even though the data stored in the memory unit 120 is in a different type format, e.g., int8, uint8, floating point, etc.

In the example of FIG. 4, the POD further includes three types of registers—A registers 604, B registers 606, and C registers 608, which feed matrix data to the matrix multiplication block 602 for matrix multiplication. The A registers 604 include a bank of registers, e.g., m number of registers, each configured to maintain one row/column of the A matrix to be fed to the columns of the array of the matrix multiplication block 602. Each A register may have a number of entries, e.g., k elements, each with a certain number of bits wide and supporting one read or write operation per cycle. It is appreciated that the data may be in each register may be in int9 format type even though the data stored in the memory unit 120 is of a different format type, e.g., int8, uint8, floating type, etc. In other words, the data is converted from one format of memory unit 120 into a different format type, e.g., int9, to be stored in a respective OCM of a processing tile to be used in an ALU calculation of the PE and/or POD operation. The entries allow each A register to fetch ahead next portions of the A matrix before they are needed for computation by the matrix multiplication block 602. The B registers 606 include a bank of registers, e.g., n number of registers, each configured to maintain one row/column of the B matrix to be fed to the rows of the array of the multiplication block 602. Similar to the A registers 604, each B register may have a number of entries, e.g., k elements, each with a certain number of bits wide and supporting one read or write operation per cycle. The entries allow each B register to fetch ahead next portions of the B matrix before they are needed for computation by the matrix multiplication block 602. The C registers 608 are configured to hold results of matrix-multiplication—the C matrix—produced by the multiplication block 602. The C registers 608 include a number of banks each configured to maintain one row/column of the C matrix. The C matrix is configured to have m×n elements.

During the matrix multiplication process, the matrix multiplication block 602 is configured to read elements of matrices A and B from the OCM only once (instead of reading each row or column of the matrices repeatedly) into the A and B registers, respectively, and thus saves memory access time to the OCM. Specifically, each matrix multiply operation has an inherent structure to it where a row of first matrix will multiply with all columns in second matrix and a column in second matrix will multiply with all rows in first matrix. As the matrix multiplication block 602 performs the matrix multiply operation, each row of the A registers 604 stays the same while the columns of the B registers 606 are fed into the matrix multiplication block 602 one at a time to be multiplied by the row in the A registers 604. At the same time, each column of the B registers 606 stays the same while the rows of the A registers 604 are fed into the matrix multiplication block 602 one at a time to be multiplied by the column of the B registers 606. As such, the matrix multiplication block 602 is configured to simultaneously multiply each row of the first matrix with all columns of the second matrix and each column of the second matrix with all rows of the first matrix. These outputs from these multiplications are accumulated and stored in the C registers until the matrix multiplication process is complete.

As shown in the example of FIG. 4, the A registers 604, the B registers 606, and the C registers 608 are each associated with a corresponding OCM streamer 603, 605, or 607, respectively, wherein each of the OCM streamers is programmed and configured to stream data from the OCM into the corresponding registers to ensure that matrix multiplication operation can be performed by the matrix multiplication block 602 in a streamlined fashion. Each OCM streamer has the address range of the OCM to be read and the stride to be followed for the next read. The A or B type of registers is configured to send a ready-for-next-line signal per bank to its corresponding streamer, wherein the bit pattern of the signal signifies which banks are requesting the next line of data. The corresponding streamer of the A or B registers responds to the read signal by sending the corresponding line of data from the OCM to the registers. The streamer sends a done signal to its corresponding registers when it sends the last line of data to be transmitted. When all of the banks of the registers have the lines of data, the A or B registers send a ready signal to the matrix multiplication block 602 that the next set of A or B registers are ready to be read into the matrix multiplication block 602 for matrix multiplication. In some embodiments, each register bank has a valid bit, which informs the matrix multiplication block 602 which values are valid and should be operated upon.

When the matrix multiplication is complete, e.g., when end of row for A matrix and end of column for B matrix are reached, the matrix multiplication block 602 informs the C registers 608 that all accumulations in the entries of the C registers 608 are complete and the entries are ready to be written back to the OCM via its corresponding streamer 607. Each bank of the C registers 608 will then send data to the OCM. If the OCM is not ready to accept the data from a bank of the C registers 608, the send is stalled and tried again in the next cycle, until the PE is ready to accept the data from the bank. In some embodiments, the C registers 608 are preloaded with data or are reset to zero before next set of accumulations during the next matrix multiplication operation. Such preloading allows for adding bias as part of the next matrix multiplication. In some embodiments, each PE is configured to accept, process, and write output C matrix from the matrix multiplication block 602 of the POD into the OCM.

According to one example, the result of the processing stored in the respective OCM may be transmitted for storage back to the memory unit 120, e.g., DDR. However, prior to storing the result the value of the result may be adjusted to the upper bound range for the data if the value exceeds the upper bound, e.g., maximum value, of the format type of the data in memory unit 120 and it may be adjusted to the lower bound range, e.g., minimum, for the data if the value is less than the lower bound range of the memory unit 120. In other words, the data may be clamped to be within the appropriate range, e.g., int8 range, uint8 range, etc. It is appreciated that the most significant bit of the int9 result may be dropped when storing the result from the OCM of the respective processing tile into the memory unit 120. Moreover, it is appreciated that a software module may track whether the data stored in the memory unit 120 was signed or unsigned such that when transferring data from the inference engine, e.g., respective OCM of the inference engine 160, to the memory unit 120, e.g., DDR, the int9 data format type can be interpreted correctly to the appropriate format type, e.g., int8 for data that was of int8 format in the memory unit 120, uint8 for data that was of uint8 format in the memory unit 120, etc.

In some embodiments, the inference engine 160 is configured to fuse/integrate these post matrix multiplication operations by each PE with the matrix multiplication operation by the corresponding POD so that these post matrix multiplication operations are performed immediately on the output from the matrix multiplication block 602 without having to transmit and save the output to the OCM first and to read the C matrix from the OCM again for these post matrix multiplication operations. By bypassing the roundtrip to the OCM, the fusion of the post matrix multiplication operations with the matrix multiplication operation saves time improves efficiency of the inference engine 160. For example, it is appreciated that in some embodiments, additional regular operations, e.g., rectified linear unit (RELU), quantization, etc., may be required on the output C matrix. Thus, a switching mechanism may be integrated within the POD architecture to determine whether additional regular operations are required and if so instead of writing the output C matrix to another memory location the output is operated on. For example, when a rectified linear operation is required the output C matrix is streamed into the RELU unit 601 configured to perform a ReLU operation on the C matrix. Similarly, when a quantization is required the output C matrix or the output of the RELU unit 601 is streamed into a quantization unit 612 configured to quantize the C matrix or a result from the RELU operations.

In some embodiments, the scale, shift, and/or offset values needed for the quantization/requantization operation may be set statically by the core 130 and may be different from different ML operations. In some embodiments, these values may be part of a ML model downloaded to the core, wherein the values corresponding to the ML operation may be read from the model and written into appropriate registers before the quantization operation starts. It is appreciated that requantization performs a rescaling of the output values stored in C register 608 for input to the quantization 612 and/or tan h/sigmoid unit 614 and subsequently for direct storage into its respective OCM block. It is appreciatd that the requantization is performed on an output data, e.g., C register 608 in this example, but in other examples it can perform requantization on other outputs from other registers. As such, performing requantization on the data stored in the C register 608 is for illustrative purposes and should not be construed as limiting the scope of the embodiments. In some embodiments, a single scaling value is applied to all elements of the output. It is appreciated that a scaling operation, which is a division operation, may be replaced with an integer multiplication and a shift operation. It is further appreciated that the relationship between the values of the integer multiplication (also referred to as integer scale value) and the shift value determines the accuracy and error in the system. In some embodiments, the relationship between the integer scale value and the shift value is obtained and the largest possible value for the integer scale value and its corresponding shift value is selected based on a register size that stores the result of the multiplication (multiplication of the output from C registers 608 and the integer scale value). In some embodiments, the output from the C register 608 may be denoted as V and the quantization multiplier may be denoted as x, where x can be greater or less than 1. It is appreciated that the relationship between the integer scale value and the shift value determines the quantization multiplier. The relationship between the integer scale value and the shift value is approximately given by equation (1) below.

$$x \sim \text{integar scale value}/(2^{\text{shift value}}) \quad (1).$$

Thus, $$\text{integer scale value} = \text{int}(x * 2^{\text{shift value}}) \quad (2).$$

It is appreciated that the largest integer scale value is limited by the register size that holds the result of the integer multiplication, hence the output of the C registers 608, say V value, by the integer scale value. For example, if V is an int32 and the register size is 64 bits, the integer scale value has to be less than the largest 32 bit integer otherwise it would overflow. In other words, the largest allowed value is 2147483647. It is appreciated that the largest allowed value for other sizes may be different and the example provide above is merely for illustrative purposes and not intended to limit the scope of the embodiments. As such, the condition set forth in equation (3) below is to be met.

$$\text{Integer scale value/largest allowed value} < 1 \quad (3).$$

In some embodiments, in order to obtain the largest possible integer scale value, equations (2) and (3) are iterated over. Initially, the shift value is 0 and with each iteration the shift value is incremented by a value, e.g., 1, 2, 5, 6, 7, 11, etc. The shift value determines the possible integer scale value and as long as the condition identified by equation (3) holds true one more iteration is performed. The process is repeated until equation (3) is no longer true, at which point, the previous shift value and its corresponding integer scale value is selected. It is appreciated that any of the previous shift values and its corresponding integer scale value may be selected even though the largest previous integer scale value and its corresponding shift value provides the highest precision given the register size. The above process to select the largest possible integer scale value and its corresponding shift value is shown in python:

```
def calculate_rscale_rshift(which_type, x):
    #calculates rscale and rshift values given a quantize_multiplier x
    # the elementwise operation is limited to 49bits in accumulator, so
    we have to reduce largest rscale to 18 bits
    # otherwise we use 64 bit accumulator and allow 32bit rscale values,
    #we can still keep the same logic for determining rshift as it will
    exit earlier
    rscale = 1
    rshift = 0
    largest_int32 = 2147483647
    largest_int18 = 131072
    if which_type == "elementwise":
        largest_int = largest_int18
    else:
        largest_int = largest_int32
    for i in range (65): # i.e. 0-64, we need rshift 1 through 63, for cases
    where shift 63 is the right answer we need to have 1 loop more
        candidate = int(x * np.power(2,i))
        #print('{ } { } '.format(i,candidate/largest_int32))
        if (candidate/largest_int) < 1.:
            #print('{ } { }' .format(candidate, i))
            rscale = candidate
            rshift = i
        else:
            return rscale, rshift
```

It is appreciated that once the integer scale value and its corresponding shift value are selected, the quantization/requantization operation may be performed. The output of the C register 608 is multiplied by the integer scale value. The result of the multiplication is shifted by the shift value, as selected above to form a scaled integer data. Once the data is scaled, additional operations may be performed, e.g., tan h operation, sigmoid operation, rounding operation, clipping/clamping operation, etc. In some embodiments, the rounding operation is performed by considering the most significant bit that falls off due to the shift operation and rounds the remaining result based on that most significant bit that has fallen off. It is appreciated that the scaled integer data may be further adjusted based on the range for the integer data. For example, if integer data stored in the memory unit 120 is int8 and if the scaled integer data exceeds the upper bound of int8 then the scaled integer data is changed and adjusted to the maximum or upper bound of int8. Similarly, if integer data stored in the memory unit 120 is uint8 and if the scaled integer data exceeds the upper bound of uint8 then the scaled integer data is changed and adjusted to the maximum or upper bound of uint8. In contrast, if the scaled integer data has a value lower than the minimum or the lower bound range of the data stored in memory unit 120, e.g., int8 or uint8, then the scaled integer data is adjusted and changed to the minimum or the lower bound range of the integer data in the memory unit 120.

Figure 5:
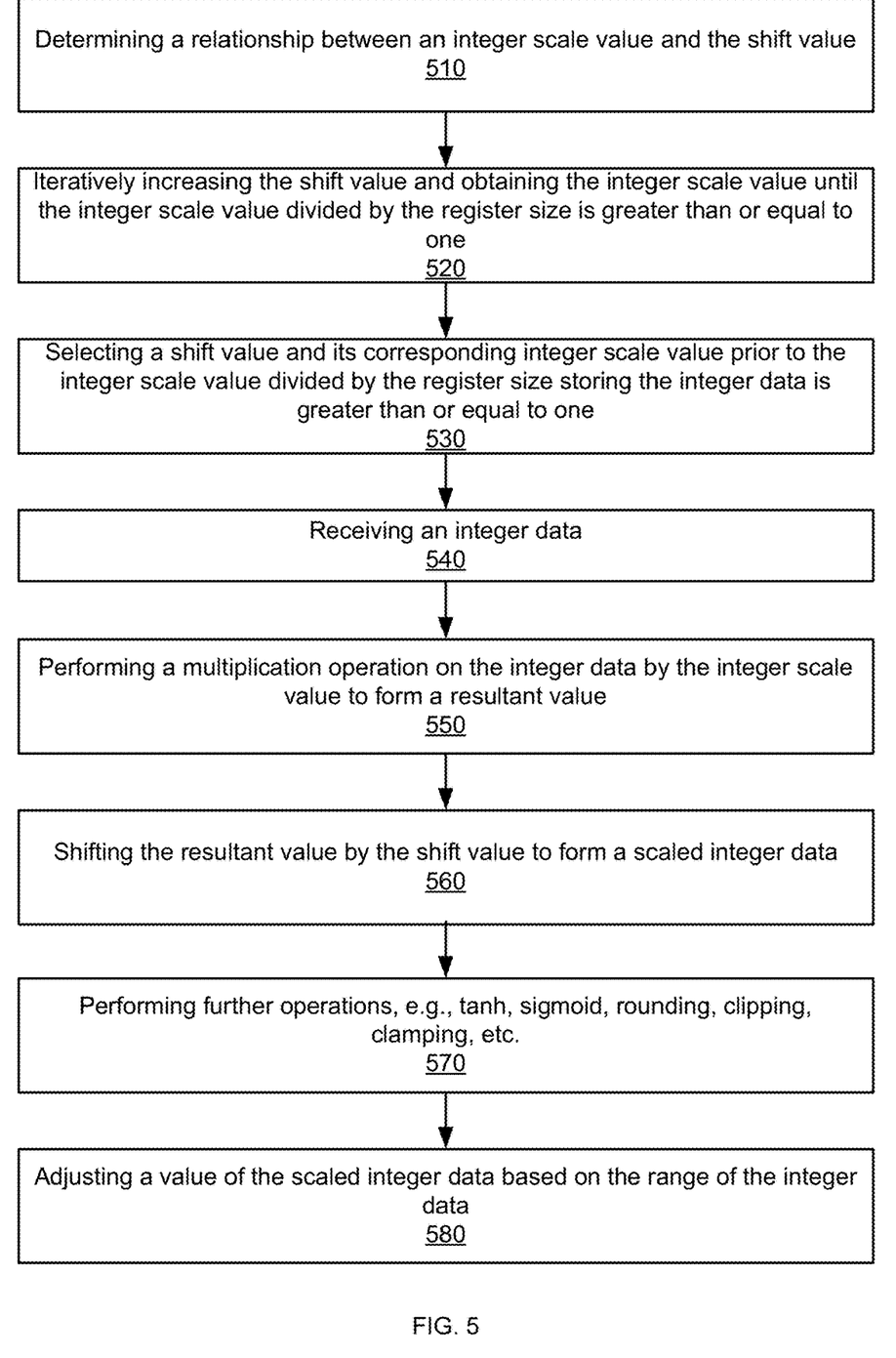
FIG. 5 show a method for rescaling of an integer data in a machine learning operation according to one aspect of the present embodiments is shown.

Referring now to FIG. 5, a method for rescaling of an integer data in a machine learning operation is shown. It is appreciated that the method illustrated in FIG. 5 is a method flow for the operation as described in FIG. 4. At step 510, a relationship between an integer scale value and the shift value is determined, as described in equation (1). At step 520, the shift value is iteratively increased and its corresponding integer scale value is obtained for equation (2) until the condition shown in equation (3) is no longer true, hence the value is greater than or equal to one. At step 530, a shift value and its corresponding integer scale value prior to the equation (3) no longer being true is selected. It is appreciated that in some nonlimiting examples, steps 510-530 are performed during the compile step and prior to any inference by the inference engine 160. At step 540, an integer value, e.g., int32 format, is received, e.g., from C register 608. At step 550, the received integer value is multiplied by the integer scale value that has been selected. At step 560, the result of the multiplication is shifted by the shift value corresponding to the selected integer scale value. At step 570, further operations may be performed, e.g., tan h, sigmoid, rounding, clipping, clamping, etc. At step 580, the value of the scaled integer data may be adjusted based on the range of the integer data stored in the memory unit 120. For example, if int8 type data is stored in memory unit 120, e.g., DDR, then if the scaled integer data exceeds the upper bound of the int8 data type then the scaled integer data is changed to the maximum or upper bound value of int8 type data. Similarly, if uint8 type data is stored in memory unit 120, e.g., DDR, then if the scaled integer data exceeds the upper bound of the uint8 data type then the scaled integer data is changed to the maximum or upper bound value of uint8 type data. In contrast, if the scaled integer data is less than the lower bound of the int8 data type then the scaled integer data is changed to the minimum or the lower bound of the int8 data type that is stored in memory unit 120, e.g., DDR. Similarly, if the scaled integer data is less than the lower bound of the uint8 data type then the scaled integer data is changed to the minimum or the lower bound of the uint8 data type that is stored in memory unit 120, e.g., DDR. Accordingly, a higher precision and accuracy is achieved based on the size of the register size.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A method of converting a data stored in a memory from a first format to a second format for machine learning (ML) operations, the method comprising:
   extending a number of bits in the data stored in a double data rate (DDR) memory by one bit to form an extended data;
   determining whether the data stored in the DDR memory is signed or unsigned data;
   responsive to determining that the data is signed, adding a sign value to the most significant bit of the extended data and copying the data to lower order bits of the extended data;
   responsive to determining that the data is unsigned, copying the data to lower order bits of the extended data and setting the most significant bit to an unsigned value; and
   storing the extended data in an on-chip memory (OCM) of a processing tile of a machine learning computer array.

2. The method of claim 1, wherein the data is an unsigned integer.

3. The method of claim 1, wherein the data is a signed integer.

4. The method of claim 1, wherein the data is 8 bits and wherein the extended data is 9 bits.

5. The method of claim 1, wherein the extended data is an int9 data.

6. The method of claim 1 further comprising:
   tracking whether the data stored in the DDR memory is signed or unsigned; and
   scheduling appropriate instructions for the extended data based on whether the data is signed or unsigned.

7. The method of claim 6 further comprising performing an arithmetic logic unit (ALU) operation on the extended data as an operand.

8. The method of claim 7 further comprising storing a result of the operation in the OCM of the processing tile of the machine learning computer array.

9. The method of claim 8 further comprising storing the result stored in the OCM into the DDR memory.

10. The method of claim 9 further comprising: prior to storing the result in the DDR memory, adjusting a value of the result to a maximum value of a range for the data if the value of the result exceeds the maximum value and adjusting the value of the result to a minimum value of the range for the data if the value of the result is lower than a minimum value of the range for the data.

11. The method of claim 9 further comprising dropping the most significant bit of the result before storing the result in the DDR memory from the OCM.

12. The method of claim 1, wherein the data stored in the DDR memory is an integer representation of the data for a floating point data.

13. The method of claim 12, wherein the floating point data is scaled and quantized to form the data in the first format.

14. The method of claim 13, wherein a first scaling value is used for converting the floating point data to an int8 format and wherein a second scaling value is used for converting the floating point data to a uint8 format.

15. A system comprising:
   a double data rate (DDR) memory configured to store integer data in a first format; and
   a machine learning processing unit comprising a plurality of processing tiles, wherein each processing tile comprises:
      an on-chip memory (OCM) configured to accept and maintain an extended data that is converted from the integer data in the first format from the DDR memory, for various ML operations, wherein the extended data includes one additional bit in comparison to the integer data in the first format, and wherein the most significant bit of the extended data is signed if the integer data in the first format is signed and wherein the most significant bit of the extended data is set to an unsigned value if the integer data in the first format is unsigned and wherein the least significant bits of the extended data is the same as the integer data in the first format.

16. The system of claim 15, wherein the integer data in the first format is either int8 or uint8.

17. The system of claim 15, wherein the extended data is int9.

18. The system of claim 15, wherein whether the integer data in the first format stored in the DDR memory is signed or unsigned is tracked and wherein appropriate instructions are scheduled depending whether the integer data in the first format is signed or unsigned.

19. The system of claim 15, wherein the extended data is an operand for an operation.

20. The system of claim 19, wherein a result of the operation is stored in the OCM.

21. The system of claim 20, wherein the result of the operation that is stored in the OCM is further stored in the DDR memory.

22. The system of claim 21, wherein a value of the result is adjusted to a maximum value of a range for the integer data in the first format if the value of the result exceeds the maximum value and adjusting the value of the result to a minimum value of the range for the integer data in the first format if the value of the result is lower than a minimum value of the range for the data, prior to storing the result in the DDR memory.

23. The system of claim 21, wherein the most significant bit of the result is dropped before storing the result in the DDR memory.

24. The system of claim 15, wherein the integer data in the first format is integer representation of a floating point data, and wherein the floating point data is scaled and quantized to form the integer data in the first format.

25. The system of claim 24, wherein a first scaling value is used for converting the floating point data to an int8 format and wherein a second scaling value is used for converting the floating point data to a uint8 format.

* * * * *